(12) United States Patent  
Sachaschik et al.

(10) Patent No.: US 8,393,521 B1  
(45) Date of Patent: Mar. 12, 2013

(54) FLASH RING SEPARATOR

(75) Inventors: Dennis Sachaschik, New Lenox, IL (US); Thomas K. Yeung, Bolingbrook, IL (US); Russell D. Carpenter, Lockport, IL (US); Frank K. Anthony, Shorewood, IL (US); Tom G. Hamric, Morris, IL (US); Joy Elaine Allen, Joliet, IL (US); Marlon Cobbins, Park Forest, IL (US); Joseph Paluga, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/331,416

(22) Filed: Dec. 20, 2011

(51) Int. Cl.  
*B23K 20/12* (2006.01)

(52) U.S. Cl. ............ 228/112.1; 228/113; 228/114; 228/2.1

(58) Field of Classification Search .......... 228/112.1, 228/113, 114, 2.1  
See application file for complete search history.

(56) References Cited

U.S. PATENT DOCUMENTS

| | | | |
|---|---|---|---|
| 3,438,561 A * | 4/1969 | Calton | ............ 228/13 |
| 3,452,914 A | 7/1969 | Oberle et al. | |
| 3,853,258 A | 12/1974 | Louw et al. | |
| 4,256,253 A | 3/1981 | Nishiwaki | |
| 5,699,952 A | 12/1997 | Fix, Jr. | |
| 5,785,805 A | 7/1998 | Fix, Jr. | |
| 6,044,821 A | 4/2000 | Weng | |
| 6,095,395 A | 8/2000 | Fix, Jr. | |

FOREIGN PATENT DOCUMENTS

| | | |
|---|---|---|
| EP | 0 405 658 A2 | 1/1991 |
| EP | 0 405 658 B1 | 1/1991 |
| EP | 0 993 897 A2 | 4/2000 |
| EP | 1 354 662 A1 | 10/2003 |

* cited by examiner

*Primary Examiner* — Erin Saad  
(74) *Attorney, Agent, or Firm* — Miller, Matthias & Hull

(57) ABSTRACT

A method of producing a welded assembly from a first metal part and a second metal part includes bringing the first metal part and the second metal part into contact with one another at a joint region while providing a flash ring separator adjacent the joint region configured to intercept and separate flash. After heating the joint region, the first and second metal parts are forced together to join the first metal part to the second metal part, extruding metal flash from the joint region. The extruded flash impinges on the flash ring separator, forming a flash ring having at least one indentation. During subsequent machining of the welded assembly to remove the flash ring, the flash ring may fragment at the indentation, so that it does not cause damage by becoming hung around the assembly.

15 Claims, 7 Drawing Sheets

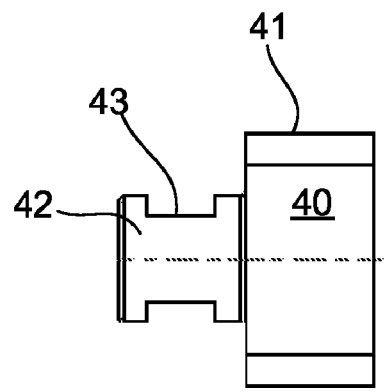
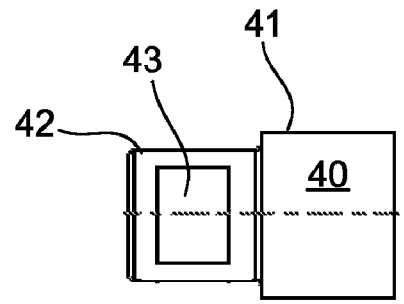
FIG. 7A  FIG. 7B
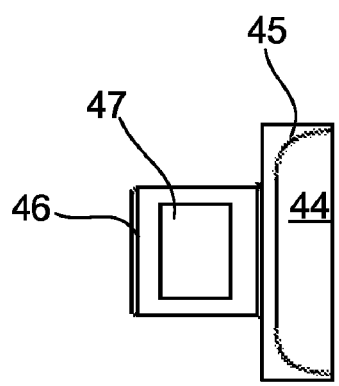
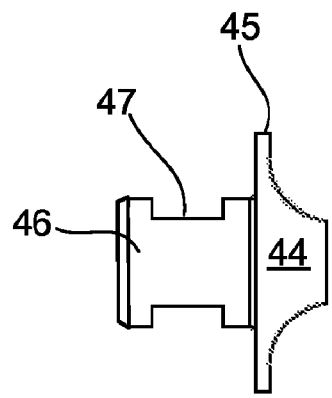
FIG. 7C  FIG. 7D

FLASH RING SEPARATOR

TECHNICAL FIELD

This patent disclosure relates generally to the friction-welding of metal components and, more particularly to a system for reducing potential for damage caused by flash rings during turning of welded parts.

BACKGROUND

In the fabrication of metal components, it is often necessary to join two previously produced pieces together. This may be the case, for example, where one part is formed by milling while the other is formed by forging. It also occurs when the two parts have different finishes, such as one that is nitride or bead-blasted and one that is chromed. Whatever the case, when a permanent joint between metal parts is needed, welding is often employed. In general, a welded joint tends to be stronger and more resilient that joints made by mechanical fasteners such as screws, bolts, or rivets.

Although many welding techniques have been developed and used throughout the years, friction welding fulfills a unique role. Friction welding is solid-state welding process that induces plasticity in the metals being joined via heat generated by mechanical friction between the pieces. In general, friction welding is accomplished by interfacing a spinning component to a stationary one to generate heat at the interface, and then forcing the pieces together when plasticity occurs in the parts. This fuses the materials. Although friction welding may be viewed as a form of forging by some, the term "welding" herein is used to denote a process by which two metals are permanently joined in a process wherein material at the joint is at sufficient temperature and pressure to produce metal flash at the joint.

As will be appreciated, friction welding provides numerous benefits. Total joining times as low as a few seconds make friction welding a time-efficient technique. Moreover, the use of friction rather than direct heat means that very little of the metal volume beyond the weld interface is affected, and the fact that little or no full melting occurs means that grain growth and other melt-related issues can be largely avoided. Yet another advantage of friction welding is that it can be used to weld materials of very different types, where a wide difference in melting points precludes the use of traditional welding techniques. Examples of welds where friction welding is required include the welding of aluminum to high-strength steel, steel to copper, aluminum alloy to high-nickel-alloy materials and others.

During friction welding, some amount of plastic metal is forced out of the joint during the final forcing phase to create "flash," which is later removed. While the production of flash may beneficially remove surface impurities from the joint volume itself, the hardened flash can also cause problems in the final welded product. During spin welding where the stationary part is generally cylindrical, the flash forms a flash ring at or just slightly displaced from the level of the joint. Once the weld itself is complete, the welded item is turned as a whole, e.g., in a lathe, and a cutting tool is progressively applied to slowly remove the spinning flash.

Unfortunately, the flash ring sometimes breaks from the part during turning, but remains as a ragged ring of metal hung on the spinning part. When this happens, the flash ring can quickly scour the surface of the spinning part and destroy any precision finish that may have existed there. This is especially troublesome and costly when the part is chromed or otherwise finely finished, and in some cases may result in the need to scrap the entire welded assembly. Thus, while friction welding has many benefits, the occurrence of loose flash rings in this manner has the potential to significantly counteract the efficiency and economy of materials that might otherwise be enjoyed via friction welding.

It will be appreciated that this background description has been created by the inventors to aid the reader, and is not to be taken as a reference to prior art nor as an indication that any of the indicated problems were themselves appreciated in the art.

SUMMARY

In an embodiment, a method is provided for producing a single welded assembly from a first metal part and a second metal part. The method includes bringing the first metal part and the second metal part into contact with one another at a joint region and providing a flash ring separator adjacent the joint region configured to intercept and separate flash impinging upon it. The metal in the joint region is heated to a temperature such that the metal becomes plastic, at which point the first and second metal parts are forced together at the joint region to join the first metal part to the second metal part. In this process, metal flash is extruded from the joint region to impinge on the flash ring separator, forming a flash ring having at least one indentation therein formed by the flash ring separator.

In another embodiment, a method is provided for welding a first metal part to a second metal part, including heating the joint region between the parts to a point of plasticity and forcing the first metal part and the second metal part together at the joint region, thus joining the first metal part to the second metal part and extruding an annulus of metal flash from the joint region. While extruding the annulus of metal flash from the joint region, the flash is impeded in at least one location to form at least one indentation in the annulus of metal flash.

In yet another embodiment, a flash ring separator is provided. The flash ring separator has a body formed of a heat-resistant material. The body includes a top portion having an extending edge for contacting and separating extruding metal flash during welding as well as a bottom portion configured to mate with and attach to a rod clamp for holding a rod during welding of the rod.

Further and alternative aspects and features of the disclosed principles will be appreciated from the following detailed description and the accompanying drawings, of which:

BRIEF DESCRIPTION OF THE DRAWINGS

FIGS. 7A-7D are side views of a pair of alternatively configured flash ring separators in accordance with alternative embodiments.

DETAILED DESCRIPTION

This disclosure relates to welding of metal components, and specifically to friction spin welding (herein referred to as friction welding). As noted above, friction welding often creates a flash ring made up of hardened metal extruded from the joint, and the flash ring often needs to be removed in order to create a finished part. However, the traditional use of a lathe to turn down the flash ring can result in the flash ring breaking loose while still remaining hung about the spinning part. When this happens, the loose flash ring may scour the part, ruining its finish and potentially ruining the entire part.

The described system, in general terms, reduces the occurrence of this problem by providing a mechanism that forms the flash in a frangible manner. This allows for the continued use of friction welding and the continued use of a lathe to turn down the flash, but without allowing a flash ring that could break loose as an annular unit and remain suspended around the spinning part.

Figure 1:
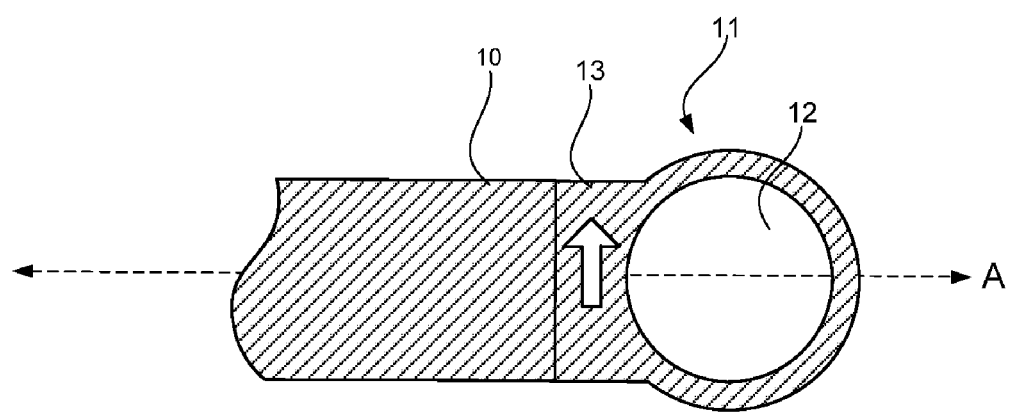
FIG. 1 is a schematic diagram of a friction weld setup prior to spinning and forcing within which an embodiment of the disclosed principles may be implemented.

FIG. 1 is a simplified cross-sectional view of exemplary friction weld components used to create a finished hydraulic rod, i.e., a cylindrical rod 10 and a rod end 11 with a straight bearing 12 and a cylindrical shank 13 of generally the same diameter as the cylindrical rod 10. In the illustrated configuration, the rod end 11 is being spun about an axis A while the cylindrical rod 10 is held stationary adjacent the spinning rod end 11. As the cylindrical shank 13 of the rod end 11 spins about the axis A against the end of the cylindrical rod 10, the interface region becomes heated due to friction.

Figure 2:
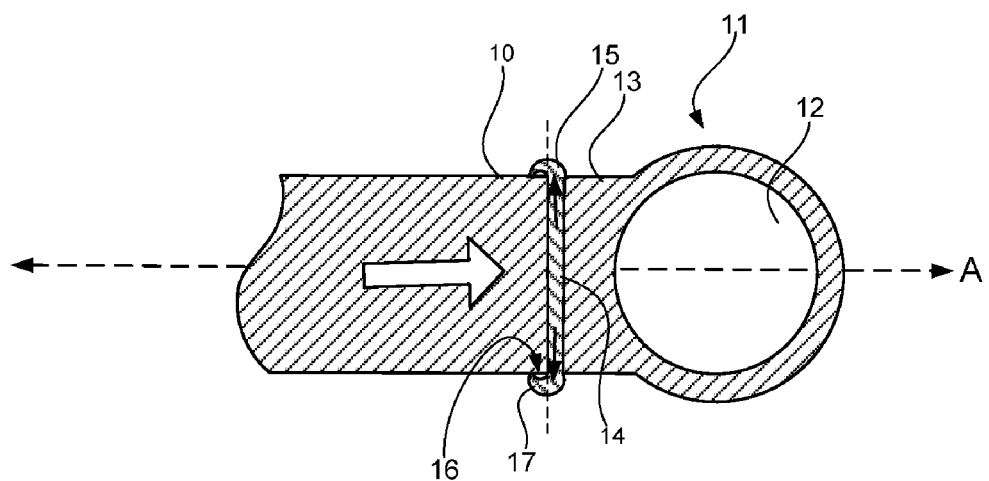
FIG. 2 is cross-sectional view of a typical friction weld between a non-rotating rod and a spun eye showing a typical flash pattern.

As shown in FIG. 2, once the metal at the joint region 14 is heated sufficiently to become plastic, the spinning of the rod end 11 about the axis A is stopped and the cylindrical rod 10 is forced into the rod end 11 laterally along axis A. The forcing process essentially forges the pieces together, but in the process, a flash ring 15 around the joint is created. In general, the flash ring 15 curls away from the spun part, in this case the rod end 11, and toward the forced part, which in this case is the cylindrical rod 10.

Although in theory it is possible to leave the flash ring 15 in place without affecting the joint, it is often a practical necessity that the flash ring 15 be removed to allow installation and/or use of the welded assembly. However, as can be seen in FIG. 2, the flash ring 15 often contains an annular hollow 16 due to the manner in which the extruded flash curls during the welding process. If the welded assembly is turned on a lathe to remove the flash ring 15, there is a possibility, as often happens, that the lower annular portion 17 of the flash ring 15 will break loose from the joint as an annular unit when the cutting tool reaches the annular hollow 16. As discussed above, the loose flash ring or portion thereof hanging suspended from the spinning assembly often causes severe damage.

To prevent such damage, a flash ring separator is provided for use in scoring the flash ring 15 during the weld. In this way, during subsequent turning on a lathe, the flash ring 15 will fragment at one or more points on its circumference rather form a singular annular piece suspended from, and potentially damaging, the spinning part. An exemplary flash ring separator 20 is shown in FIG. 3.

Figure 3:
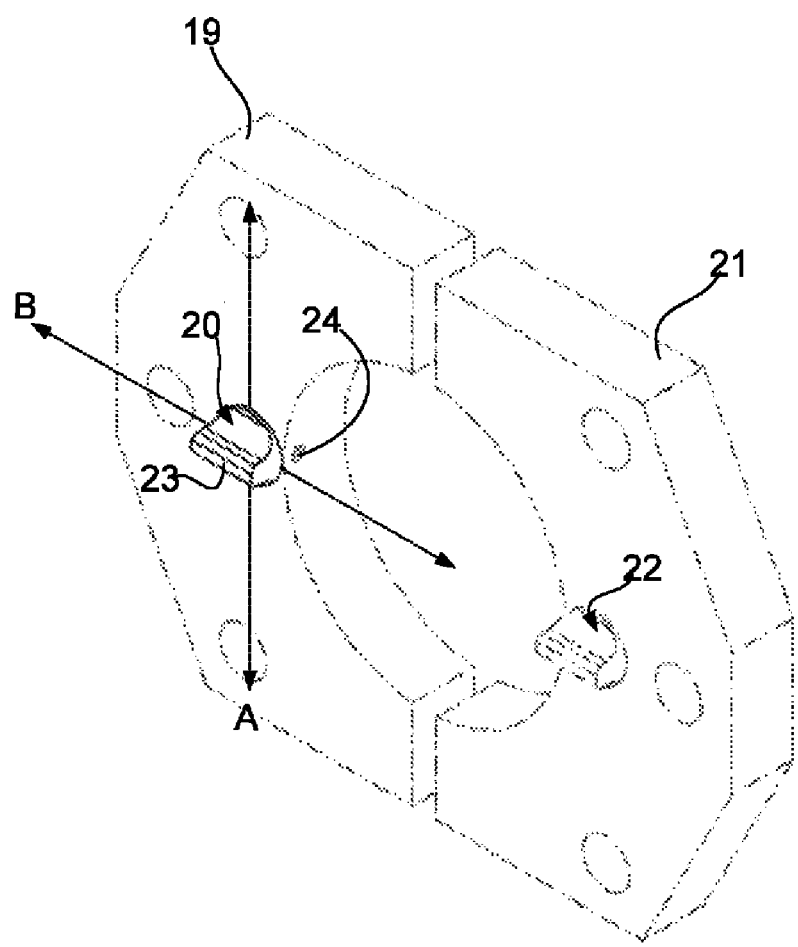
FIG. 3 is a perspective view of a stationary clamp including a mounted flash ring separator for preventing flash rings in accordance with an embodiment.

In particular, FIG. 3 is a perspective view of a rod clamp comprising a first rod clamp half 19 and a mating second rod clamp half 21 used together to clamp the cylindrical rod 10 stationary while the rod end 11 is spun, and then to force the cylindrical rod 10 into the rod end 11 once a point of plasticity is reached. In an embodiment, each rod clamp half 19, 21 has an attached rod contact portion, not visible in this view, which actually contacts the rod. The rod contact portions may include or be constructed of a fiber or other non-marring heat-resistant material, not shown, to avoid scratching or deforming the part being held.

The flash ring separator 20 is shown affixed to the first rod clamp half 19, and a matching separator 22 may optionally be fixed in a diametrically opposed position (or other position if desired) on the second rod clamp half 21. Alternatively, a single flash ring separator 20 may be used. Although the top edge 23 of the flash ring separator 20 is pointed upward along the rod axis rather than inward toward the joint, it will be appreciated that when flash forms as illustrated in FIG. 2, it initially emerges perpendicular to the rod axis, but then curls downward along the rod. Thus, in the illustrated orientation on the rod clamp half 19, the flash ring separator 20 serves to impinge the flash from beneath as it curls away from the spun part (now stationary), scoring the flash as it forms and preventing an unbroken ring from forming.

The flash ring separator 20 may be formed as an integral part of the first rod clamp half 19. However, in view of the heat-induced wear to which the flash ring separator 20 may be subjected, the flash ring separator 20 is included as a separate removable component in the illustrated embodiment. In this embodiment, a means of attachment of the flash ring separator 20 to the first rod clamp half 19 is provided. In the illustrated embodiment, a set screw may be inserted into a suitable threaded opening 24 in the first rod clamp half 19 to secure a base portion, not shown in this figure, of the flash ring separator 20. In the event that two separators are used, a similar arrangement may be used to retain the second flash ring separator 22. The base and other features and configurations of the illustrated flash ring separator 20 according to an embodiment of the described principles will be discussed in greater detail with respect to FIG. 4.

Figure 4A:
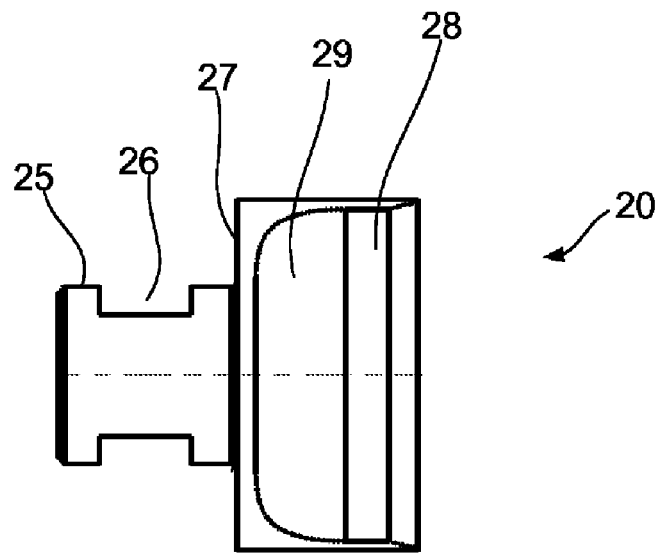
FIG. 4A is a side view of a flash ring separator such as that shown in FIG. 3, taken along axis A, in accordance with an embodiment.
Figure 4B:
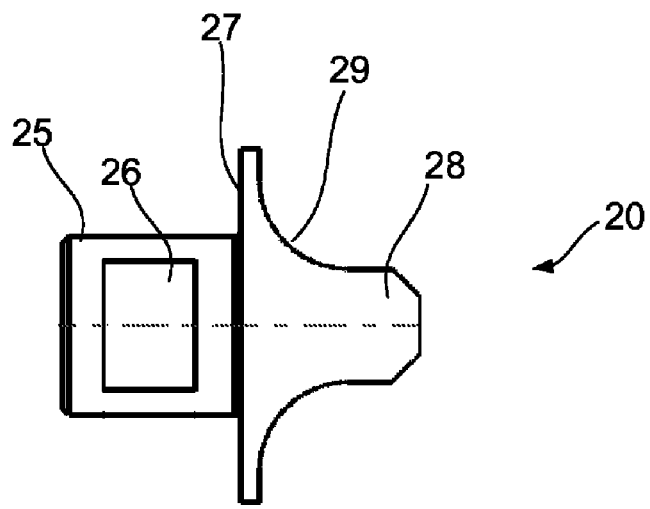
FIG. 4B is a side view of a flash ring separator such as that shown in FIG. 3, taken along axis B, in accordance with an embodiment.

In particular, FIGS. 4A and 4B are two different enlarged views of the flash ring separator 20. Although FIGS. 4A and 4B are described with reference to flash ring separator 20 and first rod clamp half 19, it will be appreciated that the second flash ring separator 22 may have generally the same features. FIG. 4A is a side view of the flash ring separator 20 taken along axis A of FIG. 3, while FIG. 4B is a side view of the flash ring separator 20 taken along axis B of FIG. 3. The illustrated flash ring separator 20 includes a base portion 25 for insertion into the first rod clamp half 19, with the base portion 25 having an indented flat 26 for engaging a set screw (not shown) such as may be threaded into the threaded opening 24 in the first rod clamp half 19 to secure the base portion 25.

The flash ring separator 20 includes a flat underside 27 for resting against the adjacent surface of the first rod clamp half 19 when the flash ring separator 20 is mounted. In this way, the flash ring separator 20 is held in place against the first rod clamp half 19 during use of the clamp, e.g., during friction welding.

The flash ring separator 20 further includes a generally wedge-shaped upper portion 28 leading to a curved ramp portion 29. It is this upper portion 28 upon which the hot flash material first impinges. Although the upper portion 28 may be more or less sharp, i.e., come to a more acute or less acute edge, the flash ring separator 20 works by separation of flow and not by cutting. Moreover, the inventors have found that broader edges, as opposed to sharper edges, are better able to resist heat damage. Thus, separators having an upper portion 28 that is either rounded or faceted from a plurality of flats as in the illustrated structure may perform better than devices that come to a cutting edge, e.g., a single linear edge of 45 degrees or less.

As such, a flash ring separator 20 having a relatively blunt upper portion 28 has been found to be most effective. Although the illustrated upper portion 28 is made of multiple flats, it will be appreciated that the exact form of the upper portion 28 is not important, and a rounded or pointed upper portion 28 may instead be used. Other non-limiting examples of alternative flash ring separator shapes will be discussed later after a discussion of how the illustrated flash ring separator 20 operates in principle.

Figure 5:
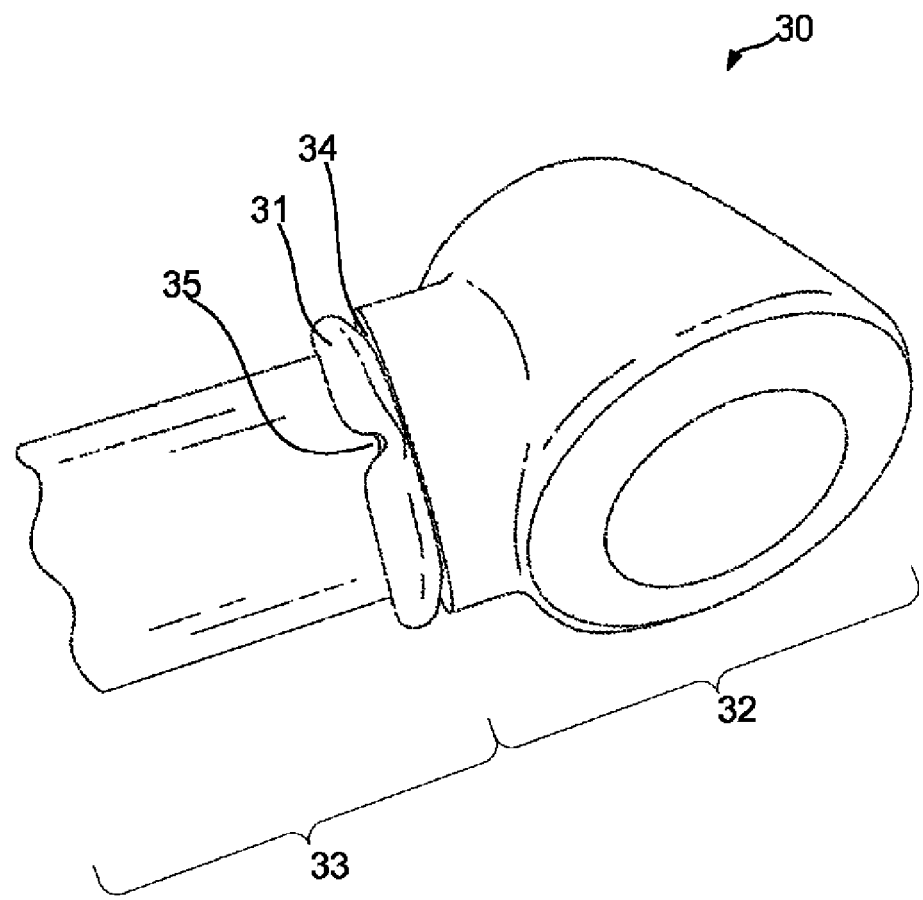
FIG. 5 is a perspective view of a friction welded rod and rod end showing the weld flash produced by the welding process as well as the scoring produced by the flash ring separator.

The manner in which the flash ring separator 20 operates during welding may be better appreciated from the perspective view of a welded rod as shown in FIG. 5. In particular, FIG. 5 shows a perspective view of a welded rod assembly 30 after friction welding but prior to finishing to remove the flash ring 31. The welded rod assembly 30 includes a rod end 32 and a rod 33 joined at a weld joint 34. The weld joint 34 is surrounded by flash ring 31 formed when the weld joint 34 was made in the manner discussed above.

As can be seen, the flash ring 31 includes an impression or indentation 35 made during impingement of the hot flash on a flash ring separator such as that shown in FIGS. 3, 4A and 4B. The flash ring 31 may also include a second impression or indentation, not visible in this view, if a second additional flash ring separator is used. As noted, the illustrated welded rod assembly 30 is shown after the weld is made but prior to finishing and removal of the flash ring 31.

In order to finish the welded rod assembly 30, the welded rod assembly 30 may be turned on a lathe and a cutting tool introduced against the flash ring 31. As the cutting of the flash ring 31 proceeds, it will reach a point when the remaining portion of the flash ring 31 fragments at the indentation 35 and falls away from the welded rod assembly 30 without damaging the assembly. The point when the flash ring 31 fragments may be when the cutting tool reaches the internal cavity (FIG. 2) of the flash ring 31. After removal of the flash ring 31, the weld joint 34 may be further smoothed and finished if needed or desired.

Having discussed the form and function of the flash ring separator 20 according to an embodiment, and the resulting flash structure, a number of structural and compositional options and alternatives will be discussed. The joint and extruded flash may reach substantially elevated temperatures (e.g., 1300° F.) during the welding process. Thus, a flash ring separator generally benefits from high heat tolerance.

One material option having suitable if marginal heat resistance characteristics is H13 tool steel. This material is resistant though not impervious to the hot weld during the bonding process. However, this material works best with a large surface area in contact with the hot flash; the larger the surface area the more the heat is spread out in order to resist melting. While H13 is capable of a high Rockwell hardness (e.g., around 47 RC for use as a flash ring separator), a flash ring separator should also have high "heat" hardness to avoid deformation during impingement by the hot flash. For example, while Titanium is resistant to temperatures up to 3000° F., it has very low heat hardness, and thus, though usable, is subject to rapid deformation.

In order to improve reusability and wear characteristics without increasing the surface area of the flash ring separator blade or upper portion beyond practical limits, other materials with greater heat hardness may be employed. While H13 may need to be replaced frequently, other materials such as INCONEL HX may provide greater wear resistance. This material holds heat hardness up to 2000° F. The composition of INCONEL HX is: Cr—20.5-23.0; Fe—17.0-20.0; Mo—8.0-10.0; Co—0.5-2.5; W—0.2-1.0; C—0.05-0.15; Si—1.0 (max); Mn—1.0 (max); P—0.04 (max); S—0.03 (max); remainder Ni.

A flash ring separator as shown in FIGS. 4A-4B composed of INCONEL HX was tested on 12 welds and showed little to no wear. As such, INCONEL HX is a further alternative to H13. Another alternative is H26 tool steel, which also has high heat hardness. H26 is a medium carbon, 18% tungsten hot work tool steel that retains good working hardness at welding temperatures. Its composition is C—57; W—18.00; Cr—4.00; and V—1.00.

Overall, although all the materials discussed above are functional in the described role for parting the flash, not all were equal in terms of longevity. In particular, among the listed options, INCONEL HX provided the best hot wear characteristics. Nonetheless, it will be appreciated that many materials could be used to form the described flash separators.

In addition to the material from which the flash ring separator is made, the shape of the separator also affects the operational and wear characteristics of the device. In particular, the extent to which the flash ring separator extends from the face of the rod clamp can also affect performance. Since the curved ramp portion 29 of the flash ring separator 20 (FIGS. 4A-4B) operates to form the flash while the wedge-shaped upper portion 28 of the flash ring separator 20 operates to groove the flash as it forms, it is desirable, though not strictly required, to engage the flash with both the curved ramp portion 29 and the wedge-shaped upper portion 28 during the welding process. Thus, although flash ring separators of one inch or greater in projection from the clamp face may be used, a projection of 0.5" has been found to work well, providing good contact of the flash ring to both the curved ramp portion 29 and the wedge-shaped upper portion 28 or "edge."

In addition to the length of the flash ring separator from the clamp face, the shape of the flash ring separator also has an effect on operation. One variable in the configuration of the flash ring separator is the direction in which the blade of the device faces. As noted above, the device shown in FIGS. 3, 4A and 4B have edges that face upward away from the rod clamp face and along the rod axis toward the weld joint. This configuration accommodates the tendency of the flash to curl down along the rod.

Figure 6:
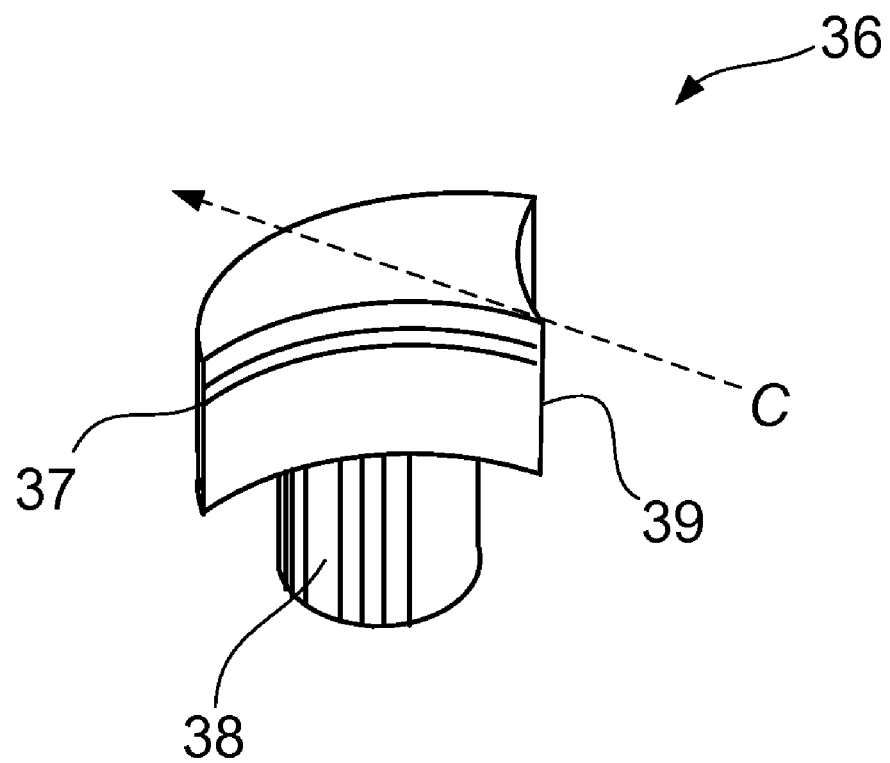
FIG. 6 is a perspective view of an alternative flash ring separator for creating frangible flash rings in accordance with an embodiment.

However, the flash may be intercepted radially closer to the weld joint and/or may, in some applications, be extruded directly away from the joint without curling. Thus, a non-limiting possible alternative flash ring separator 36 is shown in FIG. 6. The illustrated alternative flash ring separator 36 includes a top portion 37 and base portion 38. Unlike the previously discussed configurations, the edge 39 of the top portion 37 of the alternative flash ring separator 36 faces radially along the rod clamp face (not shown) to which the base portion 38 is mounted. In this way, the alternative flash ring separator 36 engages the extruded flash as it exits the joint radially in direction C.

Other non-limiting example configurations for the flash ring separator are shown in FIGS. 7A-7D. In particular, FIG. 7A is a side view of an alternative ovoid flash ring separator 40 having a roughly ovoid top portion 41 for intercepting the extruded flash radially from the weld joint. The alternative ovoid flash ring separator 40 also includes a bottom portion 42 similar to the foregoing embodiments for mounting the flash ring separator 40 to the rod clamp face, e.g., via a set screw. As such, the bottom portion 42 as illustrated includes a flat 43 for engaging a set screw. FIG. 7B shows the same flash ring separator 40 from the side again, but rotated axially by 90°.

FIG. 7C is a side view of an alternative blunt flash ring separator 44 having a top portion 45 for intercepting the extruded flash axially from the weld joint. The top portion 45 in this embodiment is of the same general shape as that shown in FIGS. 3, 4A and 4B, but is shorter, e.g., having an extent away from the rod clamp face of about 50% relative to the device shown in FIGS. 3, 4A and 4B. The alternative blunt flash ring separator 44 also includes a bottom portion 46 similar to the foregoing embodiments for mounting the flash ring separator 44 to the rod clamp face, e.g., via a set screw. As such, the bottom portion 46 as illustrated includes a flat 47 for engaging a set screw. FIG. 7D shows the same flash ring separator 44 as in FIG. 7C, but wherein the flash ring separator 44 is rotated axially by 90°.

Although several alternative shapes have been shown for the flash ring separator device herein, it will be appreciated that the illustrated shapes are only examples, and that other suitable shapes, sizes, numbers and/or arrangements of flash ring separators may be used to notch the flash ring in one or more places to create a frangible flash ring. Moreover, a flash ring separator used in a given installation need not match all other flash ring separators used in the same installation. Further, although the flash ring separator is illustrated as being a separable component so that it may be replaced if needed, it is also contemplated that one or more flash ring separators will be formed unitarily with the rod clamp in an embodiment.

INDUSTRIAL APPLICABILITY

The described principles are applicable to the welding of metallic parts wherein the welding operation creates a generally annular ring of unwanted flash material, an annular portion of which may become loosely detached but remain hung about the part in question. Within this context, the described devices and principles create a frangible flash ring, such that during machining of the ring, it will fragment and fall away rather simply detach as an annular unit and remain hung about the welded assembly.

By reducing the ability of flash rings to damage welded assemblies, the described flash ring separator reduces scrap substantially, resulting in cost savings. The flash ring separator also raises throughput not only through the reduction of scrap but also by speeding the removal of the flash ring by eliminating the need for slow and careful handling. It also eliminates the need for operator intervention in many cases, e.g., to cut a detached flash ring so that it drops away from the assembly. By making the flash ring frangible, the flash ring separator also increases tooling life by reducing the amount of machining required to remove the ring.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

We claim:

1. A method for producing a single welded assembly from a first metal part and a second metal part comprising:
    bringing the first metal part and the second metal part into contact with one another at a joint region;
    providing a flash ring separator adjacent the joint region configured to intercept and notch flash impinging upon the flash ring separator;
    heating metal in the joint region to a temperature such that the metal in the joint region becomes plastic; and
    forcing the first metal part and the second metal part together at the joint region to join the first metal part to the second metal part and thus extruding metal flash from the joint region to impinge on the flash ring separator, forming a flash ring having at least one notch formed radially through the flash ring by the flash ring separator such that as the flash ring is cut from the joint region, it breaks at the at least one notch such that it no longer forms a ring about the joint.

2. The method for producing a single welded assembly from a first metal part and a second metal part in accordance with claim 1, wherein the first metal part is a cylindrical metal rod and the second metal part is a rod end having a cylindrical metal shank.

3. The method for producing a single welded assembly from a first metal part and a second metal part in accordance with claim 2, wherein bringing the first metal part and the second metal part into contact with one another at a joint region further comprises grasping the cylindrical metal rod with a rod clamp having a face facing the joint region.

4. The method for producing a single welded assembly from a first metal part and a second metal part in accordance with claim 3, wherein providing a flash ring separator adjacent the joint region includes mounting the flash ring separator on the face of the rod clamp facing the joint region.

5. The method for producing a single welded assembly from a first metal part and a second metal part in accordance with claim 4, wherein the flash ring separator has an edge portion and wherein as mounted on the rod clamp, the edge portion faces axially along the rod toward the joint region.

6. The method for producing a single welded assembly from a first metal part and a second metal part in accordance with claim 4, wherein the flash ring separator has an edge portion and wherein as mounted on the rod clamp, the edge portion faces radially toward the joint region.

7. The method for producing a single welded assembly from a first metal part and a second metal part in accordance with claim 1, wherein heating the metal in the joint region to a temperature such that the metal in the joint region becomes plastic includes rotating at least one of the first metal part and second metal part relative to the other of the first metal part and second metal part to generate heat via friction in the joint region.

8. The method for producing a single welded assembly from a first metal part and a second metal part in accordance with claim 1, further comprising causing at least an annular portion of the flash ring to fragment and separate entirely from the welded assembly.

9. The method for producing a single welded assembly from a first metal part and a second metal part in accordance with claim 8, wherein causing at least an annular portion of the flash ring to fragment and separate entirely from the welded assembly comprises spinning the welded assembly and bringing a cutting tool into contact with the flash ring.

10. The method for producing a single welded assembly from a first metal part and a second metal part in accordance with claim 1, wherein providing a flash ring separator adjacent the joint region comprises providing multiple flash ring separators adjacent the joint region.

11. A method for welding a first metal part to a second metal part comprising:

heating a joint region between the first metal part and the second metal part to a point of plasticity and forcing the first metal part and the second metal part together at the joint region, thus joining the first metal part to the second metal part and extruding an annulus of metal flash from the joint region; and while extruding the annulus of metal flash from the joint region, impeding the flash in at least one location to form at least one notch radially through the annulus of metal flash, such that when the notched annulus of metal flash is cut from the joint region, it breaks at the at least one notch such that it no longer forms an annulus about the joint.

12. The method for welding a first metal part to a second metal part in accordance with claim 11, wherein the first metal part is a cylindrical metal rod and the second metal part is a rod end having a cylindrical metal shank, and wherein heating the joint region between the first metal part and the second metal part to a point of plasticity comprises spinning the metal shank of the rod end against the cylindrical metal rod while holding the rod stationary, thereby generating heat via friction at the joint region.

13. The method for welding a first metal part to a second metal part in accordance with claim 12, wherein spinning the metal shank of the rod end against the cylindrical metal rod while holding the rod stationary comprises mounting the rod in a rod clamp having a face facing the joint region.

14. The method for welding a first metal part to a second metal part in accordance with claim 13, wherein impeding the flash in at least one location includes mounting at least one flash ring separator on the face of the rod clamp facing the joint region such that the at least one flash ring separator impedes the flash during extrusion.

15. The method for welding a first metal part to a second metal part in accordance with claim 13, wherein the at least one flash ring separator has an edge portion and wherein as mounted on the rod clamp, the edge portion faces toward the joint region.

* * * * *